Nov. 7, 1967

L. L. LECHENE 3,351,387

PLASTIC BRISTLE MATS AND METHOD OF MAKING SAME

Filed May 17, 1966

INVENTOR
LEO L. LECHENE

BY *Cullen, Sloman, & Cantor*

ATTORNEYS

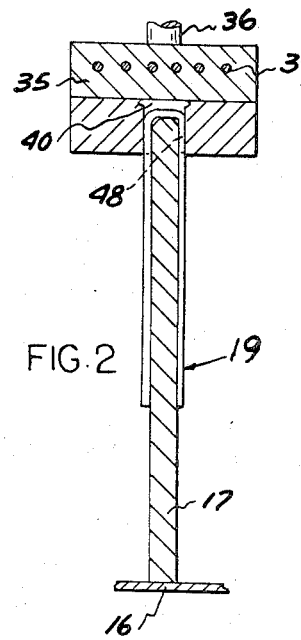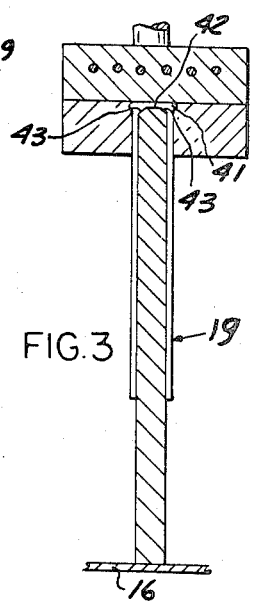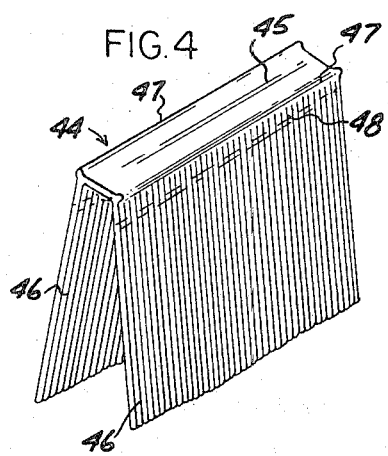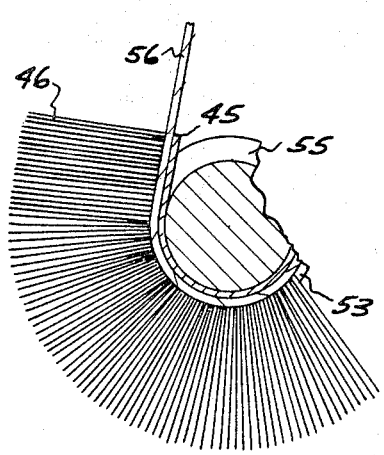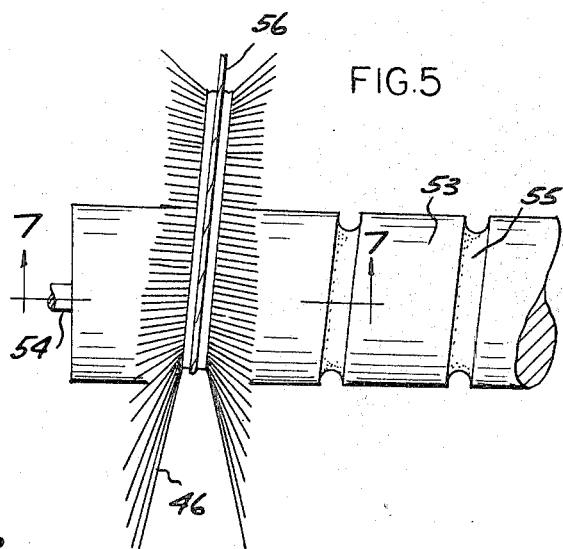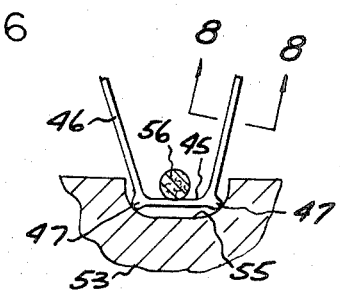

3,351,387
PLASTIC BRISTLE MATS AND METHOD OF MAKING SAME
Leo L. Lechene, R.D. 1, Box 364, Patton, Pa. 16668
Filed May 17, 1966, Ser. No. 550,668
11 Claims. (Cl. 300—21)

The present invention relates to bristle mats adapted for application and securing to the spirally-grooved core of a street-sweeping broom or other power-driven broom used for sweeping pavements.

Heretofore, various types of bristle constructions have been provided normally formed of U-shape in cross-section and adapted for application along a continuous spirally formed groove in the core of such a broom wherein a wire cord effectively secures the apex of the respective bristles within the said spiral groove throughout its length and throughout the length of said core.

The present invention is an improvement in the bristle mat and in the method of assembly shown in my earlier Patent 3,207,556 entitled, "Method of Assembling Bristles for Commercial Brooms."

In the said patent, a series of thermo-plastic bristles specially arranged in side-by-side relationship, are fused together and formed by a heated platen arrangement to general U-shape in cross-section and incorporating elongated reinforcing means across the centrally fused portions thereof wherein the reinforcing means consisted of one or a pair of transverse strands of material imbedded down into the body of the centrally fused portions.

The present invention is an improvement over the product provided in the said earlier Patent 3,207,556 constructed by an improved method which provides for an integral centrally formed bead or plurality of beads molded into the centrally fused portions of the said bristles, which are themselves fused together across their central portion into a substantial U-shape.

The advantage of the present construction is that the reinforcing beading is formed as an integral part of the bristle mat formed in the manufacturing process and does not require the application of separate or independent reinforcing means bonded to the assembly.

It is another object of the present invention to provide a novel method for the production of bristle mats in accordance with the present invention and which provides a bristle mat consisting of a series of thermo-plastic bristles arranged in side-by-side parallel engaging relation which are fused together along and across central areas thereof and formed adjacent said portions into substantially U-shape or substantially V-shape adapted for application and securing within the spirally formed groove in the core of a street sweeping broom.

These and other objects will be seen from the following specification and claims in conjunction with the appended drawings in which:

FIG. 2 is a vertical cross-sectional view of the bristle mat during an intermediate heating and bending stage.

FIG. 3 is a similar view showing the completion of the heating and bending step forming the bristle mat.

FIG. 4 is a perspective view of the bristle mat formed by said apparatus and in accordance with the method.

FIG. 5 is a side elevational view showing the mounting of the bristle mat upon the supporting core within the supporting spirally-grooved core fragmentarily shown.

FIG. 6 is a broken-away transverse sectional view thereof.

FIG. 7 is a fragmentary section taken in the direction of arrows 7—7 of FIG. 5, on an increased scale.

FIG. 8 is a section taken in the direction of arrows 8—8 of FIG. 7.

Figure 1:
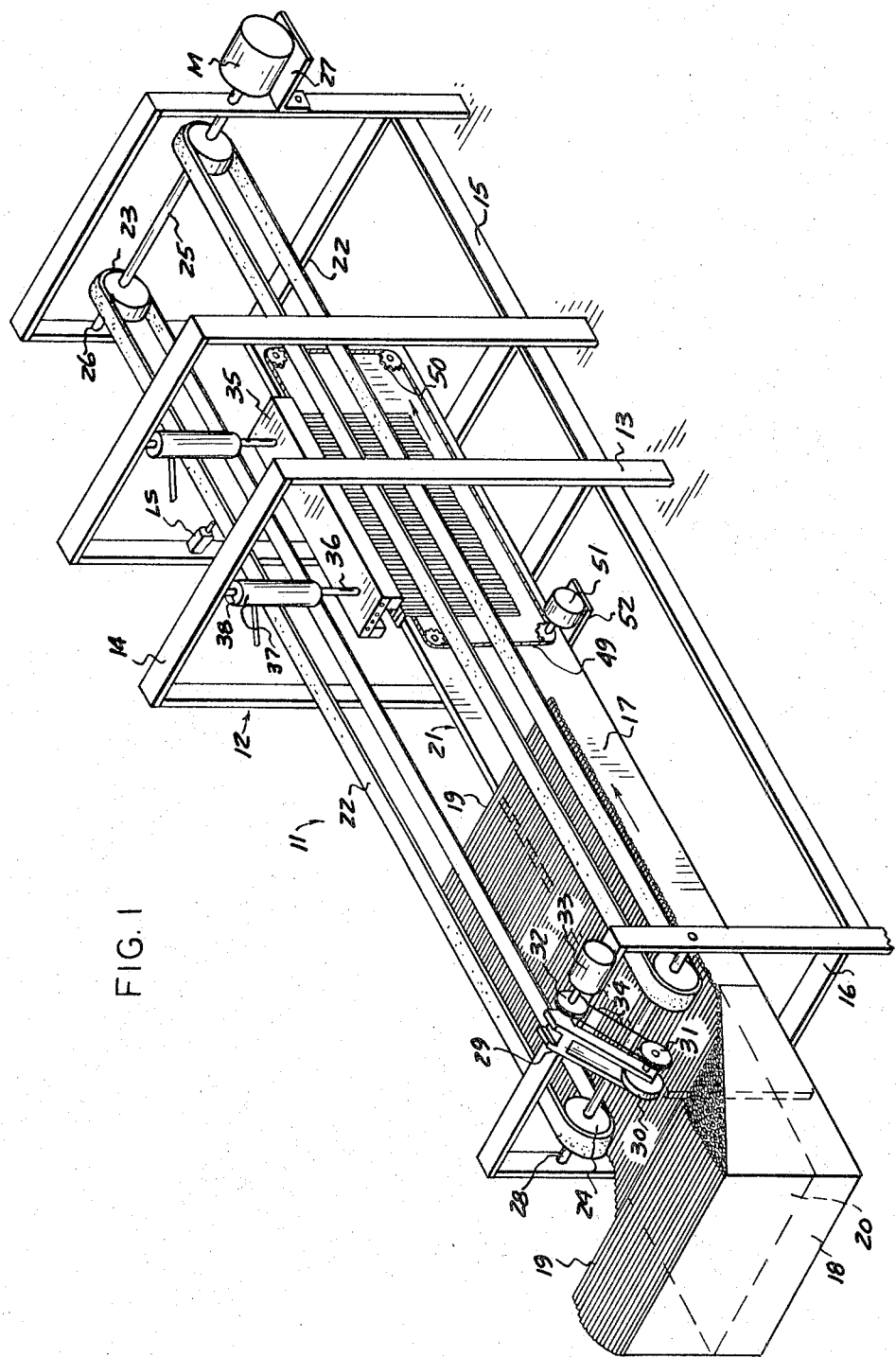
FIG. 1 is a schematic perspective view of the apparatus for producing the present bristle mat.

It will be understood that the above drawings illustrate merely a preferred embodiment of the invention and the present steps of the method, and that other embodiments are contemplated within the scope of the claims hereafter set forth.

Referring to the drawings, the bristle mat 44 shown in FIG. 4 is produced by the method employing the apparatus shown in FIG. 1, being generally indicated at 11 and including framework 12 consisting of a series of longitudinally spaced inverted U-shaped frame elements 13 with top crossbars 14, longitudinal reinforcements 15, and cross supports 16.

Within the framework and mounted centrally of the cross supports 16 and rigidly secured thereto is the upright elongated forming bar 17, which is nested within the open framework 12.

Hopper 18 is secured within the framework extending from one end thereof for loading a stack of elongated plastic or thermo-plastic bristle elements 19 constructed of polypropylene or other thermo-plastic material which rests in a stack upon the bottom wall 20 of said hopper, which bottom wall is in close horizontal registry with the forward edge of the forming bar 17 and in registry with its top support and forming surface 21, by which the individual bristle elements 19 may be fed from the hopper directly onto the top surface 21 of said forming bar, as best shown in FIG. 1. A pair of continuous flat conveyor belts 22 are arranged in parallel relation spaced from opposite sides of the upright forming bar 17 with the bottom surfaces of the said belts corresponding to their lower flights in frictional operative registry with the free end portions of the elongated plastic bristles 19.

The respective belts 22 are movably supported upon the drive wheel 23 and idler wheel 24, the said drive wheel being secured upon rotative shaft 25 journaled at 26 within the framework and driven by motor M upon the bracket 27, FIG. 1.

The respective idler wheels 24 are journalled upon the support shaft 28 interposed between the first frame elements adjacent the hopper 18.

Downwardly depending frame 29 is secured to a central portion of the framework adjacent the hopper 18 and at its lower end portions journals the variable speed feeding wheel 30, which is connected to power-driven pulley 31. The latter is joined to driven pulley 32 by a suitable belt 34, pulley 32 being driven by motor 33 mounted upon the frame.

Intermediate the length of the frame 12 and centrally thereof is arranged the horizontally disposed, vertically movable heated platen 35 which is suspended from the lower ends of a pair of longitudinally spaced upright piston rods 36 which extend from a pair of pressure cylinders 37, which are provided with suitable connections for providing, as desired, reciprocal movements of the rods 36 and corresponding, reciprocal movements of the heated platen 35. The individual pressure cylinders 37, which may be hydraulic or pneumatic, are suspended as at 38 from spaced portions of the hollow framework 12 as best shown in FIG. 1.

The platen 35, FIGS. 2 and 3, includes an upper portion through which extends a series of electric resistance heating coils 39. The platen also includes, on its undersurface, a portion having an upright slot 40 adapted for relative movement with respect to the top forming edge 21 of the forming bar 17. At intermediate position the heated platen with respect to the forming bar as shown in FIG. 2 shows the bristles as bent downwardly under the slotted portion of the said platen and with respect to the opposing sides of the forming bar. FIG. 3 shows the final position of the platen at the completion of the heating and pressure stroke to form the mat of bristles such as shown at 44 in FIG. 4.

The central elongated recess 40 formed in the undersurface of the platen 35 has along its upper edges the elongated cut-out portions 41 adapted for cooperation with the preformed top surface 21 of the forming bar 17.

As best shown in FIGS. 2 and 3, the forming bar has a top central flattened portion 42 which terminates at its opposite sides in the elongated, tapered portions 43, which in cooperation with the chamber 40 and the grooves 41 form in the finished article the opposed pair of elongated spaced beads 47, FIG. 4, which serve as continuous, integral reinforcing beads for the mat of bristles shown.

Said mat includes the central mounting area 45 and the substantially right angularly arranged, but diverging bristle end portions 46 which diverge from the respective integral beads 47 adjacent the outer edge of the central reinforcing fused areas 45 of the said bristles. This central area has been flattened by the forming bar and is substantially rectangular in cross-section, such as shown in FIGS. 4 and 7, and wherein the opposed pair of integral reinforcing beads 47 strengthen the central area of the bristle mat in securing thereof as shown in FIGS. 5, 6, and 7.

The central area portion of the bristle mat 44 of FIG. 4 outwardly of the beads 47 includes areas of limited width as at 48 wherein the bristles are fused together for a distance from the beading not exceeding the spacing between said beads 47. The remainder of the said bristles are free for transverse flexing in use.

The bristles 19 are substantially oval in cross-section as shown in FIG. 8, but could be of circular cross-sectional shape or other shape if desired. For increased efficiency of utilization bristles are normally arranged side-by-side with the long axis of the oval cross-section horizontally disposed when bristles of oval cross-sectional shape are employed.

As shown in FIG. 1 a limit switch LS is mounted upon a portion of the framework 12 normally in the path of longitudinal movement of the group of bristles 19 as translated over the forming bar 17 by the conveyor belts 22 so as the forwardmost bristle 19 engages the said limit switch, feed movement of the belt 22 is interrupted by deactivation of motor M, FIG. 1. Successively, the platen 35 normally elevated with respect to the forming bar 17 is energized, and the platen moves downwardly, being suitably pre-heated at temperatures in the range of 300 and 400° F., being a suitable fusing temperature as desired for the particular thermo-plastic material employed and is moved downwardly with respect to the bristles 19, which overlie the top forming edge 21 of the forming bar so that the bristles are bent downwardly into substantial parallel relation upon opposite sides of the forming bar through the two progressive steps shown successively in FIGS. 2 and 3.

A suitable timing device is employed by which the platen 35 is held down under pressure of the said cylinders 37 for sufficient time to enable the individual strands 19 or bristle elements to fuse together at their central portions as at 45 and to simultaneously form the pair of opposed integral elongated reinforcing beads 47 at the outer sides of the central fused portion 45, FIG. 4, said beads being formed by the cooperating grooves 41 adjacent the space 40 upon the undersurface of the platen and in cooperation with the tapered portions 43 of the top elongated edge of forming bar 17. Through the functioning of said timing device the heated platen is then retracted under the operation of the pressure cylinders 37 which may be hydraulic or pneumatic and the motor M is reenergized so that the belts 22 proceed to bring another fill or group of bristles in side-by-side engaging relation over the top surface of the forming bar into position directly beneath the heated platen 35. Simultaneously, therewith, a pair of upright conveyors 49 in the form of sprocket chains or the like are arranged upon opposite sides of forming bar 17 extending around the respective sprockets 50 driven by motor 51 on bracket 52.

It is noted that the material, namely the bristle elements 19, that have been formed and fused by the platen 35 now extend with the bristle ends in a vertical position, thus forming a fused mat 44, FIG. 4, which may be slidably extracted from the forming bar by the said pair of opposed conveyor chains 49 arranged upon opposite sides of forming bar 17. These conveyors 49 operate simultaneously with the belt 22 as best shown in FIG. 1.

In the construction of the present apparatus it is essential that the filling wheel or feeding wheel 30 be located precisely in the center of the bristle elements 19 as well as the central portion of the feeding bar and of an exact height from the said feeding bar as will cause the said feeding wheel to pick up exactly one strand 19 at a time sliding the same onto the feeding bar 17. The feeding wheel 30 is furthermore so situated directly ahead of the conveyor belts 22 at their forward ends that the said feeding wheel releases the strand 19 successively so that the particular strand is simultaneously and frictionally engaged by the corresponding leading portions of the lower flight of the feeding conveyor belts 22. By this construction the individual bristle elements 19 move longitudinally over the forming bar 17 with their central portions resting slidably upon the top forming edge 21 of said forming bar. Outer portions of the bristle elements 19 are supportably engaged by the undersurface portions of the lower flights of the respective conveyor belts 22 as the said elements are moved in a group onto and along the forming bar until they reach the station directly under the reciprocal platen 35.

At that moment, the leading bristle 19 engages the limit switch LS within the frame work to de-energize the motor M and to stop feeding long enough for the forming operation above described.

It is of great importance that the top edge of the forming bar have the flattened surface portion 42 to form the central flattened area 45 of the mat produced during the compressing operation of the platen 35 so that this flattened portion is adjacent to and registers with the point of the bonding surface of the central engaging portions of the individual bristle elements. The excess material flowing from the compressive operation with the bristles in fused condition is squeezed into the edge portions corresponding to the bevels 43 of the forming bar and with respect to the groove portions 41 in the heated platen to thus provide completed beads 47 adjacent the flattened area 45 as shown in FIG. 4.

It is this present construction of the reinforcing beads 47 formed transversely on both sides of the central flattened portion 45 which provides for the reinforcement of the bristle mat 44.

The present method of fabricating a bristle mat primarily consists of the following general steps:

(1) Feeding successively from a hopper a plurality of elongated thermo-plastic bristles in side-by-side parallel engaging relation cross-wise onto the top edge of an elongated forming bar which extends in the direction of said feed and supportably receives the central transverse portions of each bristle;

(2) Longitudinally feeding a group of said bristles as a unit upon and along said forming bar to a forming station;

(3) Applying heat to the central areas of said bristles fusing them to each other at said central areas and simultaneously applying pressure to said bristles at said areas and bending their end portions at substantially right angles through the central areas along opposite sides of the forming bar to provide a fused mat of assembled bristles of general U-shape in cross-section wherein the legs or free ends of the bristles are partly diverging.

An additional step is contemplated, namely, the forming of one or a pair of beads within and through the central reinforcing fused area.

The area 45 is substantially flattened to facilitate nesting within the spiral groove 55 as best shown in FIG. 7 in securing of the bristle mats therein.

The method additionally includes the step of simultaneously forming fused areas for the bristles outwardly of the said beads over a distance not to exceed the spacing between the beads in the fused bristle mats.

While a general oval or circular cross-sectional shape has been shown for the plastic bristles 19, it is contemplated that other cross-sectional shapes could be employed and, furthermore, the fusing heat sufficiently achieves the fusing above set forth of the particular material of which the bristles are made.

The bristle mats shown in FIG. 4 are made in a continuous operation and wherein it is seen that feeding of the bristle elements is interrupted during the forming operation under the platen 35 and that when feeding is re-activated the conveyor elements 49 are simultaneously activated for moving the bristle mat in its final form from the machine at the same time that the conveyors 22 move a new series of bristle elements 19 directly under the platen 35 for a further and subsequent forming, but continuous operation.

In the illustrative embodiment of the present invention the bristle mat has been shown with a single layer of bristles since this is more than likely the way by which the bristle mats would be employed in the manner shown in FIGS. 5, 6, and 7.

In utilizing the present bristle mat there is employed an elongated core 53 of wood or other material with journals 54 at its opposite ends as fragmentarily shown, FIG. 5, and provided with a spiral continuous groove 55 therein into which the bristle mats are fed during a continuous turning operation of the broom core 53 and with the wire or other securing cord 56 tightly and snugly applied to the central flattened portions of the bristle mat, FIGS. 6 and 7, and with the winding continuing throughout the length of the core and with successive bristle mats applied in end-to-end relationship throughout the groove 55 in said broom core. There may be situations where it would be desirable to apply perhaps a pair of bristle mats in superimposed relation. This is contemplated and possible in accordance with the present invention.

Having described my invention reference should now be had to the following claims, I claim:

1. The method of fabricating a bristle mat for application and securing to the spirally-grooved core of a broom comprising the following steps:
    feeding successively from a hopper a plurality of elongated thermo-plastic bristles in side-by-side parallel engaging relation cross-wise onto the top edge of an elongated forming bar which extends in the direction of feed and supportably receives the central transverse portions of each bristle;
    longitudinally feeding a group of said bristles as a unit upon and along said forming bar to a forming station;
    applying heat to the central areas of said bristles fusing them to each other at said central areas and simultaneously applying compressive pressure to said bristles at said areas and bending their end portions at substantially right angles to said central areas along opposite sides of said forming bar to provide an elongated fused mat of assembled bristles of general U-shape in cross-section with the legs of said U-shape partly diverging.

2. In the method of claim 1, the further step of simultaneously forming throughout said central areas an elongated continuous reinforcing bead.

3. In the method of claim 1, and the further step of simultaneously forming in said central areas a pair of parallel spaced elongated continuous reinforcing beads.

4. In the method of claim 1, and the further step of simultaneously forming in said central areas a pair of parallel spaced elongated continuous reinforcing beads; the portion between said beads being substantially flattened to facilitate nesting and securing of said mat in said spirally-grooved core.

5. In the method of claim 1, and the further step of simultaneously forming in said central areas a pair of parallel spaced elongated continuously reinforcing beads; and longitudinally feeding said formed mat along said forming bar to a delivery station.

6. In the method of claim 1, and the further step of simultaneously forming in said central areas a pair of parallel spaced elongated continuous reinforcing beads; said fusing heat being in the range of 300 to 400° F. approximately.

7. In the method of claim 1, and the further step of simultaneously forming in said central areas a pair of parallel spaced elongated continuous reinforcing beads; the further step of simultaneously fusing together adjacent portions of said bristles outwardly of said beads for a distance approximating the spacing between said beads.

8. A bristle mat adapted for application and securing to the spirally-grooved core of a broom comprising a series of elongated thermo-plastic bristles fused together across their central areas providing a mounting area;
    said bristles having their free end portions extending from opposite sides of said central areas approximately at right angles to the mounting area, but partly diverging;
    and an elongated reinforcing bead formed integrally with said central areas across said bristles and through said centrally fused portions.

9. Bristle mat of claim 8 there being a pair of beads integrally formed across said centrally fused area in spaced relation;
    located at the junction of the bristles with said fused central area.

10. In the bristle mat of claim 9, said central area between said beads being flattened and substantially rectangular in cross-section.

11. In the bristle mat of claim 10, portions of said bristles outwardly of said beads being fused together for a distance approximating the space between said beads.

References Cited

UNITED STATES PATENTS

| | | | |
|---|---|---|---|
| 2,303,800 | 12/1942 | Swann | 300—2 |
| 2,531,482 | 11/1950 | Starr | 300—21 |
| 2,812,214 | 11/1957 | Sandelin | 300—21 |
| 2,980,467 | 4/1961 | Lechene | 300—21 |
| 3,207,556 | 9/1965 | Lechene | 300—21 |

GRANVILLE Y. CUSTER, JR., *Primary Examiner.*